United States Patent [19]

Hornibrook et al.

[11] 4,248,918
[45] * Feb. 3, 1981

[54] PRESSURE SENSITIVE PRODUCTS AND ADHESIVE FORMULATIONS

[75] Inventors: Walter J. Hornibrook, Newburgh; Ronald A. Lombardi, New Windsor, both of N.Y.

[73] Assignee: Stauffer Chemical Company, Westport, Conn.

[*] Notice: The portion of the term of this patent subsequent to Feb. 3, 1998, has been disclaimed.

[21] Appl. No.: 913,279

[22] Filed: Jun. 7, 1978

Related U.S. Application Data

[62] Division of Ser. No. 816,236, Jul. 18, 1977.

[51] Int. Cl.³ .................. B32B 7/06; B32B 27/20
[52] U.S. Cl. .................. 428/40; 428/323; 428/328; 428/335; 428/336; 428/337; 428/338; 428/354; 428/356
[58] Field of Search .................. 428/40, 328, 323, 335, 428/336, 337, 317, 355, 356; 156/327, 332; 252/512, 511; 260/37.9, 42.52, 37 M, 42.22; 427/207 B, 208.4

[56] References Cited

U.S. PATENT DOCUMENTS

| | | | |
|---|---|---|---|
| 2,575,265 | 11/1951 | Fiedler et al. | 260/42.22 |
| 2,858,230 | 10/1958 | Knoll et al. | 260/42.22 |
| 3,075,853 | 1/1963 | Striker et al. | 428/352 |
| 3,234,038 | 2/1966 | Stephens et al. | 428/328 |
| 3,300,428 | 1/1967 | Schmidt | 260/42.22 |
| 3,332,055 | 7/1967 | Bogner | 260/42.22 |
| 3,379,560 | 4/1968 | Tharp | 428/40 |
| 3,389,105 | 6/1968 | Bolger | 260/42.22 |
| 3,475,213 | 10/1969 | Stow | 428/328 |
| 3,872,051 | 3/1975 | Tiedeman et al. | 260/37 M |
| 3,910,857 | 10/1975 | Phillips | 260/37 M |
| 3,988,494 | 10/1976 | McAdow | 428/328 |
| 4,097,445 | 6/1978 | Martins et al. | 260/37 M |

FOREIGN PATENT DOCUMENTS

| | | | |
|---|---|---|---|
| 687156 | 5/1964 | Canada | 428/328 |
| 2402928 | 2/1975 | Fed. Rep. of Germany | 260/37 M |

*Primary Examiner*—Stanley S. Silverman
*Attorney, Agent, or Firm*—Richard P. Fennelly

[57] ABSTRACT

A pressure sensitive product is disclosed which comprises: (a) a plastic film; (b) a layer of pressure sensitive adhesive attached to the film, optionally, with a backing material therebetween, said layer of adhesive containing non-leafing metallic flakes; and (c) optionally, a release liner attached to the surface of the adhesive. After application of bonding pressure, the product exhibits superior adhesion as compared to a control product not containing the metallic flakes.

10 Claims, 2 Drawing Figures

PRESSURE SENSITIVE PRODUCTS AND ADHESIVE FORMULATIONS

This application is a division of U.S. application Ser. No. 816,236, filed July 18, 1977.

BACKGROUND OF THE INVENTION

1. Field of the Invention

The present invention is a pressure sensitive plastic film product which exhibits superior adhesion after being bonded to a desired substrate with the application of pressure. The invention also relates to the pressure sensitive adhesive composition used in said product.

2. Description of the Prior Art

Pressure sensitive products which can be bonded to a desired substrate with the application of pressure are a well-known type of product. In order to insure a more permanent bonding of such products to the substrate, it is desirable for such products to exhibit the highest possible adhesion values. Although it is possible to achieve a greater degree of adhesion by chemical modification of the polymers which normally constitute the pressure sensitive adhesive layer, such an approach requires some degree of sophisticated chemical capability which might not be possessed by some of the ultimate end users of those conventional pressure sensitive adhesives which are commercially available. Hence, a need exists for a simple means to increase the adhesion values of pressure sensitive products without a need to resort to actual modification of the polymeric constituents of the pressure sensitive adhesive.

SUMMARY OF THE PRESENT INVENTION

The present invention is a pressure sensitive product which comprises: (a) a plastic film; (b) a layer of pressure sensitive adhesive attached to the film, optionally, with a backing material therebetween, said layer of adhesive containing non-leafing metallic flakes; and (c) optionally, a release liner attached to the adhesive layer. Such a pressure sensitive product exhibits superior adhesion as compared to a control product not containing the metallic flakes after it is bonded to a substrate by application of pressure. Also included within the scope of the present invention is the pressure sensitive adhesive/non-leafing metallic flake subcombination used in such a product.

BRIEF DESCRIPTION OF THE DRAWINGS

The Drawings which are attached hereto and which form a portion of the specification are intended to illustrate certain embodiments of the invention wherein.

DETAILED DESCRIPTION OF PREFERRED EMBODIMENTS

Figure 1:
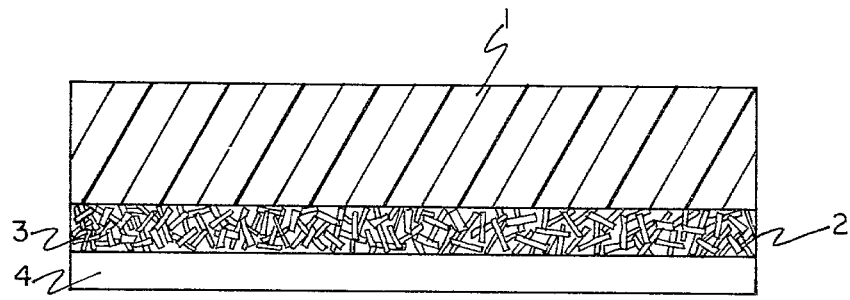
FIG. 1 is an enlarged cross-sectional view of one type of pressure sensitive product made in accordance with the present invention.

The pressure sensitive product of the present invention will be more fully understood by referring to the Drawings which form a portion of this application. In FIG. 1, one preferred embodiment of the present invention is shown in cross-section, wherein a plastic film 1 has a layer of pressure sensitive adhesive 2, containing non-leafing metallic flakes 3, laminated to one of its sides. A release liner 4 covers the side of the adhesive layer 3 which is opposite to the side attached to film 1 in order to protect the adhesive from contamination from dirt or other solid or liquid contaminants.

The plastic film 1 may be any conventional, flexible film known to persons of ordinary skill in the art of fabricating pressure sensitive products. If desired, it can be a "substantially transparent" film if a decorative product is desired. The term "substantially transparent" as used herein is intended to encompass those plastic films which are transparent enough to allow a viewer to perceive the decorative effect generated by the metallic flakes 3 in the adhesive 2. The film thickness in either a decorative or non-decorative product will generally range from about 0.05 mm. to about 0.5 mm., and the film can be a homopolymer or copolymer of vinyl chloride, the preferred film material, a polyester resin, a cellulose resin, an acrylic resin, a urethane resin, a polyolefin resin, or the like, and compatible blends thereof. Films of this type are well known to the art and have been used heretofore in forming pressure sensitive products which differ in construction from the product shown in FIG. 1.

The layer of pressure sensitive adhesive 2 which is used in the present laminate may also be formed using any of the pressure sensitive adhesives which are known and conventionally used in the art. Such an adhesive may be based upon any elastomeric adhesive material, such as: (1) natural rubber; (2) synthetic rubbers including, for example, styrene-butadiene copolymers, polyisobutylene, butadiene-acrylonitrile copolymers, polychloroprene, and polyisoprene; (3) acrylic copolymers containing at least 50 percent, by weight, of a $C_4$–$C_{12}$ alkyl acrylate ester together with a hardening comonomer, for example, vinyl acetate, styrene, methyl methacrylate, methyl acrylate, ethyl acrylate, ethyl methacrylate, and vinyl chloride; and (4) polymers of alkyl vinyl ethers such as, for example, polymethyl vinyl ether and polyethyl vinyl ether. Acrylic pressure sensitive adhesives are most preferred since they have the best balance of adhesive and cohesive properties for the present laminate. The thickness of the adhesive layer 2 will generally be in the range of from about 0.013 mm. to about 0.05 mm.

The pressure sensitive adhesive layer 2 used in the product of the present invention contains an effective amount of non-leafing metallic flakes 3 to surprisingly increase the adhesion of the product after it has been bonded with pressure to a desired substrate and, in the case of a product containing a "substantially transparent" film 1, to also produce a decorative effect in the product by being visible through the plastic film 1. These flakes 3 are homogeneously dispersed throughout the adhesive layer 2 by means of conventional mixing techniques. The term "non-leafing metallic flakes" is well known, and such products can be formed by means well known to persons of ordinary skill in the art. For purposes of the present invention, non-leafing aluminum flakes are preferred, and the following description of its method of manufacture and properties will sufficiently apprise a person of ordinary skill in the art as to how this metallic component might be formed.

The aluminum flake which can be employed in the preparation of the laminate product of the instant invention can be prepared in several ways. The most common means of obtaining aluminum flake is to atomize molten aluminum and subsequently grind it or hammer it in the presence of various lubricants. If the lubricant is a long chain saturated fatty acid, the prepared flake is not easily wetted by a resinous adhesive vehicle and tends to float to the surface subsequent to application, giving a more or less continuous layer of aluminum flakes. This phenomenon is called "leafing". Such leafing flakes are not suitable for use in the product of the present invention. It is therefore desirable to remove the long chain fatty acid or to grind or hammer the atomized aluminum in the presence of other materials such as, for example, the short chain fatty acids. The flakes thus produced are more easily wetted by the resinous adhesive vehicle and tend to become randomly dispersed, rahter than to float. They are, therefore, less likely to layer at the surface during the curing or drying of the adhesive.

The aluminum flake can, if desired, be subjected to various treatments which impart a gloss or polish thereto. These polished aluminum flakes may then be utilized when a highly reflective decorative effect is to be generated by the product of the present invention.

These non-leafing aluminum flake particles are plate-like in appearance but have a ragged edge which follows no geometrical design. The flatness or platelike appearance of the flake is generally determined by the method by which the flakes were prepared. Hammered flakes, for example, tend to be more flat than those that are ball milled. However, both types may be used in the present invention. For a more complete description of non-leafing aluminum flake and the methods of preparation of such flakes, reference is made to "Organic Coating Techlology" by Payne, Vol. II, 1961.

The particle size of the flakes should be predominantly from about 100 mesh to about 200 mesh (U.S. Standard Sieve) although a certain proportion may be above 100 mesh and up to 60 mesh. A predominant number, preferably about 80 percent of the flakes, should be from about 200 to about 60 mesh. Excellent compositions may be made using flake having as much as 15 percent below 325 mesh in size which aids suspension, although as a substantial number of the particles approach a smaller size (below 325 mesh), there may be an insufficient number of large planer surfaces provided in the adhesive to give the desired degree of opacity needed when a decorative product is desired. One suitable non-leafing aluminum flake which is commercially available from Alcan Metal Powder, Inc. is known under the grade designation "Grade MD-3100".

The aluminum flake particles are employed in amounts of at least about 5%, by weight of the adhesive layer, with a maximum of about 20%, by weight. Optimum effects have been obtained when amount of flake is present at about 12%, by weight. Use of too little flake will not give the desired effects, whereas amounts higher than described above will weaken the adhesive/substrate bond. It is most preferred that from about 10% to about 15%, by weight, of flake be used.

If desired, a tinting pigment may be added to the flake-containing adhesive composition or to the flakes themselves prior to their incorporation in the adhesive layer when a decorative product is desired. Examples of such pigments which may be used include phthalocyanine green, phthalocyanine blue, indanthrene yellow, burnt sienna, indo orange, phthalocyanine blue green tone, carbon black, phthalocyanine blue red shade, quinacridone red and hydrated ion oxide.

If the product of the present invention shown in FIG. 1 is to be manufactured at one location and used at another location, a release liner 4 is preferably affixed to the side of the pressure sensitive layer 3 which is furthest removed from film 1. The release liner 4 may be any of the release liners known to persons of ordinary skill in the art of making pressure sensitive products including removable, water soluble protective coatings, and the like. One preferred liner material is silicone coated release paper having a thickness of from about 0.05 mm. to about 0.3 mm. Of course, if the film/adhesive composite is to be manufactured and applied to a desired substrate at the same manufacturing location, a release liner may not be needed.

The laminate product of the present invention can be formed by any of the conventional techniques used to form pressure sensitive films. In a preferred embodiment, when a release liner, such as release paper, is to be used, the adhesive formulation in solvent form containing the non-leafing metallic flakes is applied to the release liner, and the adhesive/release liner composite is then heated to dry the adhesive layer. This combination is laminated to the plastic film to form the final product. In those few applications wherein the product is not intended to have a release liner, the adhesive/metallic flake composite can be cast onto the vinyl film, and the adhesive layer in the resulting laminate can then be dried.

Figure 2:
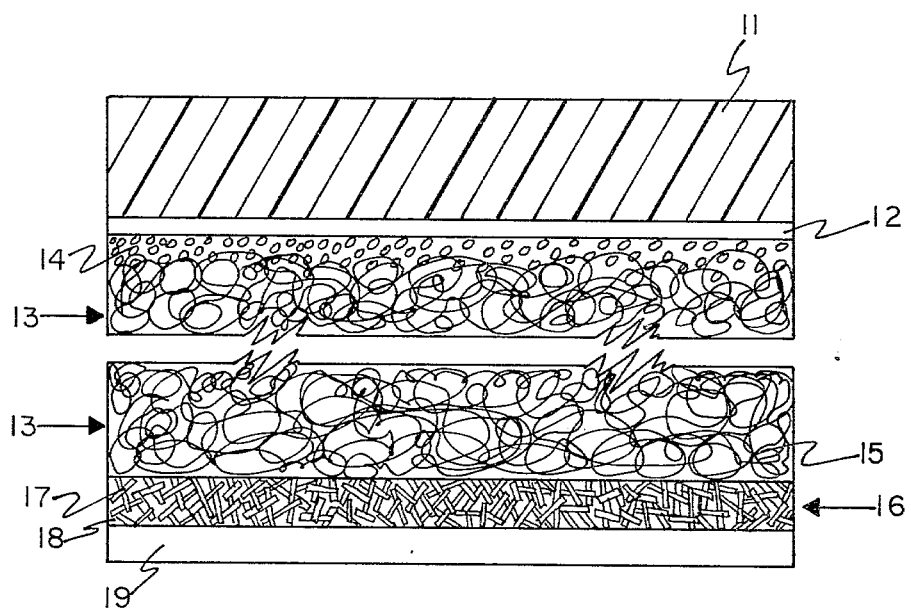
FIG. 2 is an enlarged cross-sectional view, partially broken, of another pressure sensitive product made in accordance with the present invention which contains a backing material between the adhesive layer and the film.

Another embodiment of the claimed invention is shown in FIG. 2 wherein a backed pressure sensitive product is shown. Component Nos. 11, 16, 17 and 19 in FIG. 2 are meant to indicate the same materials which are used for Component Nos. 1, 2, 3 and 4 in FIG. 1, respectively. The backing material 13, which can comprise synthetic fibers 15 needle punched into a thin layer of foam 14, is the added component in this article and can be attached to the film 11 by a suitable adhesive layer 12, if desired.

The backing 13 can be selected from a wide variety of conventional backing materials, such as non-woven, woven, knit, or composite materials (non-woven/foam combinations, non-woven/knit combinations, non-woven/woven/knit combinations, etc.) to provide a sufficiently thick layer for the intended purpose. For example, in FIG. 2, the backing (which is shown in broken form) will aid in camouflaging any surface irregularities that may exist on the substrate to which the composite article is attached. If the intended use of the composite product is as an exterior roofing material for motor vehicles, for example, its weight will range from about 68 to about 680 gm./m.$^2$, and its density from about 32 to about 320 kg./m.$^3$. The thickness of such a backing and film composite will generally range from about 0.5 mm. to about 5.1 mm., preferably from about 1.4 mm. to about 2.2 mm.

The backing material 13 shown in FIG. 2 is a commercially available backing of a non-woven fabric of synthetic fibers 15 which have been needle punched into a thin layer 14 of foam. Some preferred examples of fibers which can be used in such a backing include: polypropylene, rayon, polyester, acrylonitrile, nylon, polyphenylene sulfide, and mixtures thereof. Suitable foam materials which can be used include urethane and polyvinyl chloride foams. The denier of such fibers in this type of backing can range from about 1 to about 20. "Denier" is defined as a unit of fineness equal to the fineness of a yarn weighing one gram for each 9000 meters. The foam in such a backing can have a thickness of from about 0.25 mm. to about 2.5 mm.

The backing 13 if intended for outdoor use can be made water repellent by treatment with an effective amount of at least one conventional water repellent agent. Fluorocarbon emulsions, which are available under the trademarks "Zepel" (from E. I. DuPont de Nemours Co.) or "Scotchguard" (from 3M Co.), are representative types of materials which can be used to confer such water repellency. In order to treat the selected type of backing material, it can, for example, be placed in a fluorocarbon bath, dried, and the resulting product can be cured. The product that results from either this or alternative conventional treating procedures will resist being wetted by water, oil and other contaminants. Further information on how backing 13 might be rendered water repellent can be ascertained from "Waterproofing and Water Repellency," Kirk-Othmer Encyclopedia of Chemical Technology, 2nd Edition, Vol. 22, pp. 135–156 (1970).

If desired, one or more corrosion inhibitors can be used to treat the backing 13, if the article is to have exterior uses, in order to confer or enhance corrosion protection on the article/substrate combination. The corrosion inhibitor can be any compatible inhibitor and can be applied in conjunction with the aforementioned water repellent agent. For example, when a fluorocarbon bath treatment is employed, such known corrosion inhibitors as the nitrites, phosphates, chromates and sulfates might be present in the bath to act as a corrosion inhibitor when the article is subjected to exterior use in the final article/substrate combination that will be produced. One corrosion inhibitor which is preferred for economic reasons is sodium nitrite. Further information on how the backing 13 might be treated to render the article/substrate combination corrosion resistant can be ascertained from "Corrosion Inhibitors," Kirk-Othmer Encyclopedia of Chemical Technology, 2nd Edition, Vol. 6, pp. 317–346 (1965).

The composite article of film 11 and backing 13 which is known to the prior art can be formed by a number of well-known processes such as direct calender lamination or extrusion coating, post lamination or casting.

Direct calender lamination or extrusion coating produce a composite article without the use of adhesive layer 12. The plastic film 11 acts as the adhesive because it is brought in contact with the backing 13 shortly after formation while the film 11 is still hot and sticky.

Post lamination is another well known method and differs from the extrusion coating or direct calender lamination techniques in that the plastic film 11 is not usually formed just prior to the bonding step, and an adhesive layer 12 is applied directly by known coating techniques (gravure cylinder, knife, roller, reverse roller, etc.) to the film before the film is contacted with the backing 13. A roll of preformed film is generally the source of the film, and a thin layer of adhesive is applied to the side of the film which is to be bonded to the backing. The adhesive is applied by a suitable means usually in an amount in the range of from about 34 gm./m.$^2$ to about 170 gm./m.$^2$ depending upon the adhesive. The coated film then is contacted with the backing to form the composite article known to the prior art.

Adhesives suitable for use in the post lamination technique are well known in the art. Some examples include plastisol, epoxy, acrylic, and urethane adhesives. Plastisols are one of the best known materials. These are dispersions of finely divided polymeric materials in nonvolatile organic liquids and low melting solids, generally referred to as plasticizers. Suitable plasticizers include phthalate, adipate and sebaccate esters and polyols such as ethylene glycol and its derivatives. A typical plastisol composition is 50 parts of polymer material and 50 parts of plasticizer which forms a paste as a result of solvation of the resin particles by the plasticizer. This paste gels and fuses when heated to about 300° F. If a volatile solvent is included in the plastisol, then the adhesive generally is referred to as an organosol, which also is suitable for use in the invention.

In order to form the final pressure sensitive, composite article of the present invention, the exposed side of backing 13 is coated with a substantially continuous layer 16 of a suitable tacky, pressure sensitive adhesive comprising adhesive 18 and metallic flakes 17, such as described above in connection with Component No. 2 in FIG. 1.

The product shown in FIG. 2 can find utility without the presence of release liner 19, for example, if it is used shortly after application of the adhesive layer, and care is taken to avoid contamination of the exposed surface of the adhesive layer 16 with foreign matter. If this embodiment of the invention is desired, the adhesive in the form of a viscous fluid can be cast onto the backing 13 and dried by the application of heat. In most end uses however, the composite article will be manufactured with a suitable release liner 19 by a manufacturer, and the product will be sent to a customer for use.

The release liner 19 may be any of the release liners known to persons of ordinary skill in the art of making pressure sensitive products. One preferred liner material is silicone coated release paper having a thickness of from about 0.05 mm. to about 0.25 mm. Polyolefinic (e.g., ethylene), ethylene/vinyl acetate copolymer, ethylene/acrylic copolymer, and ethylene/chlorinated polyethylene blends which have been suitably release coated, e.g., with a silicone release agent, may also be employed as release liners.

A preferred process for affixing the film 11/backing 13 combination and the pressure sensitive adhesive layer 16 and release liner 19 comprises transfer lamination. In such a process, a solvent solution, an aqueous dispersion, or a hot melt of the adhesive layer 16 is applied to the release liner 19, and the resulting composite (except when a hot melt technique is used) is heated to dry the adhesive layer 16. The adhesive side of this adhesive/liner laminate is then laminated to the exposed surface of the backing 13, preferably at a heat lamination nip, to form the product shown in FIG. 2. The use of a heated nip insures good bonding between the adhesive layer 16 and the backing 13 which may have been treated with water repellents and/or corrosion inhibitors.

Besides transfer lamination, the adhesive layer 16 can be applied to the backing by use of conventional direct application methods using either knife, roller, reverse roller or extrusion coating techniques provided a substantially continuous and uniform coating of pressure sensitive adhesive results.

The Examples which follow will illustrate certain embodiments of the present invention:

EXAMPLE 1

This Example illustrates a procedure for forming a decorative pressure sensitive product in accordance with the present invention.

A transparent, plasticized polyvinyl chloride (PVD) film was heat laminated to itself on a lamination machine by passing two layers of such film over a series of hot drums in order to achieve a heat seal temperature of about 149° C. The PVC film was simultaneously embossed on one side with a brushed silk pattern at the lamination point. The film that resulted had a thickness of about 0.2 mm.

An adhesive formulation was then prepared which comprised 100 gm. of a 30%, by weight, solids acrylic pressure sensitive adhesive polymer and 3 gm. of a non-leafing, finely divided aluminum flake. The adhesive that was used was a high molecular weight thermoplastic acrylic terpolymer available as "Durotak 80-1053" from National Starch and Chemical Corp. The aluminum flake that was used is commercially available from Alcan Metal Powder, Inc. as "Grade MD-3100".

The adhesive and aluminum flake were mixed together for from about 5 to about 10 min. at high speed to effectively disperse the aluminum flake particles. The adhesive/aluminum flake composition was then coated onto silicone coated release paper using a laboratory coating blade. Removal of the volatiles from this coated layer was accomplished by drying the layer for 2 minutes at 121° C. in an oven. The dried adhesive thickness was about 0.03 mm.

The resultant adhesive coated release paper was then laminated to the unembossed side of the transparent PVC film by passing both the film and release paper through a laboratory nip roller at sufficient pressure to insure intimate contact of the adhesive with the film. This PVC film/adhesive/release liner laminate was then conditioned for 16 hours at laboratory ambient conditions to allow the adhesive to form a strong bond to the film. The opacity and aesthetics of the laminate were judged to be satisfactory.

Peel adhesion of the product was then determined by bonding 2.54 cm. strips of the PVC/adhesive laminate (after removal of the release liner) to a stainless steel panel using the standard Pressure Sensitive Tape Council 2.04 kg. roller. Peel adhesion at 180° was then measured after a 24 hour wetout or "dwell" period on a Thwing-Albert type tester. The value achieved was about 1.34 kg. per linear cm. Virtually all of the adhesive remained on the film thereby demonstrating both high adhesive strength to the film and high cohesive strength, the former being of more importance when the product is to be used as a permanent decorative film on a desired substrate.

A Control laminate, lacking the aluminum flake, yielded a peel adhesion of only 0.98 kg. per linear cm.

One advantage of the aluminum flake containing laminate as compared to the control laminate was the greater ease of repositionability that it exhibited. The presence of the flake reduced the "quick grab" of the adhesive allowing for initial repositioning of the laminate.

EXAMPLE 2

In another experiment, two other leafing, rather than non-leafing, aluminum flakes ("Grade MD-2100" and "Grade MD-5100" from Alcan Metal Powder, Inc.) were tried in similar amounts but they produced poor adhesion of the adhesive to the vinyl film when tested as above after 20 min. and 24 hr. dwell times on the substrate. The results of all tests are set forth in the Table which follows. All values are given in kg. per linear (abbreviated "l".) cm.

| No. | Metallic Flakes | Stainless Steel Adhesion 20 min. Dwell | 24 hr. Dwell |
|---|---|---|---|
| 1. | None (control) | 0.43 | 0.82 |
| 2. | Non-leafing[1] | 0.58 | 1.61 |
| 3. | Leafing[2] | 0.58 | 0.8 |
| 4. | Leafing[3] | 0.82 | 1.07 |

[1]"Grade MD-3100" from Alcan Metal Powder, Inc.
[2]"Grade MD-2100" from Alcan Metal Powder, Inc.
[3]"Grade MD-5100" from Alcan Metal Powder, Inc.

Each of the above samples had the following peel adhesions (in kg./l.cm.) after one minute: No. 1: 0.63; No. 2: 0.23; No. 3: 0.43; and No. 4: 0.52. No. 2, the product of this invention, has the lowest initial tack but the highest adhesion after 24 hr. dwell times.

After 20 minutes, when the film/adhesive laminates were peeled back from the panel, product Nos. 1 and 2 showed no transfer of adhesive to the plate from the film whereas products Nos. 3 and 4 showed transfer of adhesive. After 24 hours, product No. 1 showed no transfer, product No. 2 showed cohesive failure of the adhesive as illustrated by adhesive remaining on both film and panel, and products Nos. 3 and 4 showed failure of the adhesive to the film as illustrated by most of the adhesive being left on the panel. In those end uses where the product is to be left permanently on the object, these observations are merely of interest as to how the internal strength of the adhesive (cohesive strength) and bond strength of adhesive to film and/or substrate (adhesive strength) are related. Adhesion strength would be unquestionably the most important property.

EXAMPLE 3

Approximately 1835 meters of a 0.01 mm. transparent PVC film was heat laminated to itself and was simultaneously embossed on one side with a shallow brushed silk roll.

An adhesive formulation was prepared by mixing 300 gm. of the acrylic adhesive used in Example 1, 15 gm. of ethyl acetate, 15 gm. of toluene and 12 gm. of the non-leafing aluminum flake used in Example 1. The mixing was performed at high speed on a Cowles type dissolver until the flake was completely dispersed in the adhesive solution. The viscosity of the formulation after mixing was about 2000 cps. (Brookfield viscosity 25° C., No. 2 spindle, 20 rpm.).

The adhesive formulation containing the aluminum flakes was then applied to 90 pound basis weight, bleached kraft, silicone coated release paper using a reverse roll coater. A streak-free, uniform coating of adhesive on the release paper was produced, and the adhesive coating was dried by passing the adhesive/release paper laminate through an oven at 60° C. for 40 seconds followed by passage through a second oven at 132° C. for 45 seconds.

This adhesive/release paper laminate was then laminated to the unembossed side of the transparent PVC film as described in Example 1.

The resulting product was then tested against a control product that did not contain aluminum flakes in the adhesive using the test procedures described in Example 1. The adhesion at 180° was measured on stainless steel and lacquered panels using the same test method as described in Example 1. The results are given below in kilograms per linear centimeter:

| Film | Stainless Steel Adhesion | |
|---|---|---|
| | 20 min. Dwell | 24 hr. Dwell |
| Film of this Invention | 0.75 | 1.84 |
| Control | 0.61 | 1.18 |

The 20 min. dwell readings showed no adhesive transfer from the film to the substrate, whereas both 24 hour dwell readings showed slight transfer using the same units given above:

| Film | Lacquer Painted Panel Adhesion | |
|---|---|---|
| | 30 min. Dwell | 24 hr. Dwell |
| Film of this Invention | 1.0 | 2.04 |
| Control | 1.0 | 1.16 |

At 30 minutes no adhesive transfer was noted for the film of this invention as compared to slight transfer for the control film. After 24 hours on the panels, both films showed cohesive failure as evidenced by transfer of substantial amounts of adhesive to the panel.

The films were also tested to determine the resistance by the adhesive to shrinkage of the vinyl film. This was evaluated by bonding a 2.54 cm.×25.4 cm. adhesive coated film cut in the direction of travel of the film in the laminator to an aluminum panel with a standard 2.04 kg. roller. The ends of the film were scored with a razor blade and after a 2 hour wet out period at room temperature the assembly was placed in a 121° C. oven for 30 minutes. Growth of the razor cut was measured with a magnifier after the film was cooled to room temperature. The film of this invention had a mounted shrinkage of only 0.04 cm., whereas the control film had a shrinkage of 0.08 cm.

EXAMPLE 4

This Example compares the adhesion of a film of the present invention (Film A) to that exhibited by the type of decorative film known to the prior art (Film B).

Film A was an 0.2 mm. transparent polyvinyl chloride film that had been prepared by laminating two 1.0 mm. films together followed by application of adhesive containing non-leafing aluminum flakes as described in Example 1.

Film B was a 0.174 mm. transparent polyvinyl chloride film made by laminating a 0.075 mm. transparent film to the vinyl side of a 0.10 mm. film that had previously been printed on one side with a silver ink for decorative purposes. The same adhesive used in making Film A was applied to the silver ink side of the 0.175 mm. film without the presence of the aluminum flakes.

Both films were applied to lacquer painted stainless steel panels and the peel adhesion was measured after the two films had been subjected to various environmental conditions for various lengths of time. The procedure described in Example 1 was employed to mount the films and measure the peel adhesion. The Table that is given below sets forth the results that were obtained in kg./linear centimeter:

| Condition | Time | Adhesion of Film | |
|---|---|---|---|
| | | A | B |
| Room Temperature | 72 hrs. | 1.88 | 0.98 |
| 70° C. | 7 days | 1.84 | 1.16 |
| 70° C. | 30 days | 1.66 | 0.95 |
| 37.8° C. 100% Relative Humidity | 7 days | 1.88 | 1.21 |

These data demonstrate the uniformly higher adhesion values for the film of the present invention as compared to the type of film known to the prior art.

EXAMPLE 5

This Example illustrates the present invention with a plastic film/adhesive laminate containing an opaque plastic film.

The laminate of the present invention was first formed by initially forming the following adhesive formulation containing non-leafing aluminum flakes:

| Ingredient | Parts by Weight |
|---|---|
| Acrylic Pressure Sensitive Adhesive Solution* | 100 |
| Ethyl acetate | 25 |
| Isopropyl alcohol | 25 |
| Non-leafing aluminum flakes** | 2 |

*"GELVA RA 1753" from Monsanto Co.
**"Grade MD-3100" from Alcan Metal Powder, Inc.

The adhesive solution was knife coated onto release paper, was dried at 121° C. and the release paper/adhesive layer was laminated to an opaque polyvinyl chloride film. The adhesive layer was 0.02 mm. thick.

A similar process was used to form the Control film with the exception that the non-leafing aluminum flakes were not used.

The two products were tested for 180° peel adhesion to stainless steel (as described in Example 1) after having been allowed to remain for 1 minute, 10 minutes and 24 hours, respectively, on the substrate. The following values (in kg./linear cm.) were obtained with higher values being more desirable:

| Peel Adhesion After | Control | Film of the Invention |
|---|---|---|
| 1 min. applied | — | 0.51 |
| 10 min. applied | 0.41 | 0.60 |
| 24 hrs. applied | 0.60 | 1.14 |

The static creep resistance of each film was also measured. This is expressed as the time (in minutes) for the film/adhesive laminate to fall from the stainless steel substrate when a 1000 gm. load is attached to a sample having an area of 1.61 cm². Higher numbers are more desirable. The film of the present invention had a value of 2493 min., whereas the control film only had a value of 520.1 min.

The 180° peel adhesion and static creep resistance were also measured after both laminates had been aged for 7 days at 70° C. The following results were obtained. The peel adhesion values are given in units of kg./linear cm. and the creep resistance value in minutes:

| Peel Adhesion at 180° After | Control | Film of this Invention |
| --- | --- | --- |
| 1 min. applied | — | 0.04 |
| 10 min. applied | 0.24 | 0.06 |
| 24 hrs. applied | 0.22 | 0.09 |
| Static Creep Resistance | 47.7 | 342 |

The above Examples merely illustrate certain preferred embodiments of the present invention and should not be construed in a limiting sense. The scope of protection which is sought is set forth in the appended claims.

What is claimed:

1. A pressure sensitive product having increased adhesion characteristics which comprises:
   (a) a plastic film; and
   (b) a layer of pressure sensitive adhesive attached to the film containing from at least about 5% to a maximum of about 20%, by weight of the adhesive, of non-leafing metallic flakes having a predominant particle size of from 200 to 60 mesh.

2. A product as claimed in claim 1 wherein the plastic film is a vinyl film.

3. A product as claimed in claim 1 wherein the plastic film has a thickness of from about 0.05 mm. to about 0.5 mm.

4. A product as claimed in claim 1 wherein the pressure sensitive adhesive is an acrylic pressure sensitive adhesive.

5. A product as claimed in claim 1 wherein the thickness of the adhesive is from about 0.013 mm. to about 0.05 mm.

6. A product as claimed in claim 1 wherein the metallic flakes are aluminum flakes.

7. A product as claimed in claim 1 which further comprises a release liner.

8. A product as claimed in claim 1 wherein the film is a vinyl film, the adhesive is an acrylic pressure sensitive adhesive and the product further comprises a release liner.

9. A product as claimed in claim 1 wherein the flakes are aluminum flakes.

10. A product as claimed in claim 1 which further comprises a backing material between the layer of pressure sensitive adhesive and film.

* * * * *

UNITED STATES PATENT AND TRADEMARK OFFICE
CERTIFICATE OF CORRECTION

PATENT NO. : 4,248,918
DATED : February 3, 1981
INVENTOR(S) : Walter J. Hornibrook et al.

It is certified that error appears in the above-identified patent and that said Letters Patent are hereby corrected as shown below:

Cover Sheet, under the heading "Related U.S. Application Data", "Division of" should read -- Continuation-in-Part of --;

Col. 3, line 15, "rahter" should read -- rather --;

Col. 3, line 33, "Techlology" should read -- Technology --; and

Col. 7, line 1, "(PVD)" should read -- (PVC) --.

Signed and Sealed this

Twenty-sixth Day of May 1981

[SEAL]

Attest:

RENE D. TEGTMEYER

Attesting Officer — Acting Commissioner of Patents and Trademarks